United States Patent [19]

Hacker

[11] 4,153,130
[45] May 8, 1979

[54] APPARATUS FOR USE IN DISASSEMBLING AN AUTOMOBILE TRANSMISSION

[76] Inventor: Ronald Hacker, 390 Linwood Ave., North Tonawanda, N.Y. 14120

[21] Appl. No.: 832,800

[22] Filed: Sep. 12, 1977

Related U.S. Application Data

[63] Continuation of Ser. No. 719,357, Sep. 1, 1976, abandoned.

[51] Int. Cl.² ............................................. B60K 17/22
[52] U.S. Cl. ................................... 180/70 R; 138/89; 184/1.5; 220/287; 220/352
[58] Field of Search .......................... 180/70 R, 70 P; 184/1.5; 220/307, 287, 352; 138/89 R, 96 R

[56] References Cited

U.S. PATENT DOCUMENTS

| | | | |
|---|---|---|---|
| 1,992,815 | 2/1935 | Craney | 180/70 R |
| 2,082,826 | 6/1937 | Frisby | 180/70 R |
| 2,403,520 | 7/1946 | Gerner | 180/70 R X |
| 2,612,293 | 9/1952 | Michel | 220/356 X |
| 3,610,288 | 10/1971 | Carr | 138/96 R |
| 3,791,551 | 2/1974 | Madeira | 220/307 |
| 3,987,930 | 10/1976 | Funson | 138/96 R X |
| 4,037,429 | 7/1977 | Britzius | 180/70 R |

Primary Examiner—John P. Silverstrim
Attorney, Agent, or Firm—Christel, Bean & Linihan

[57] ABSTRACT

A closure device, or more specifically a hand held plug, for engagement over the end of the output shaft of an automobile transmission subsequent to the disconnection of an automobile driveshaft from said transmission output shaft. The closure plug includes two co-axially aligned tubular portions separated from one another by a transversely disposed fluid barrier. The tubular portions have different nominal diameters so as to be operable with transmissions having output shafts and associated seals of different diameters. The closure plug is utilized to preclude the potential loss of transmission fluid through the wall of the transmission housing after disconnection of the automobile drive shaft.

6 Claims, 4 Drawing Figures

APPARATUS FOR USE IN DISASSEMBLING AN AUTOMOBILE TRANSMISSION

This is a continuation of application Ser. No. 719,357 filed Sept. 1, 1976, now abandoned.

BACKGROUND OF THE INVENTION

This invention relates generally to a tool device to be utilized by mechanics in servicing transmissions in automobiles and other similar types of driven vehicles. More specifically, the tool device or closure plug of the present invention is utilized to substantially preclude the loss of fluid maintained within the housing of a transmission subsequent to the disconnection of a vehicle driveshaft therefrom when servicing the transmission or vehicle components related thereto.

A substantial problem is encountered in servicing automobile transmissions or similar types of vehicles having fluid filled transmission housings when it becomes necessary to disconnect a vehicle driveshaft from the transmission associated therewith. Generally, transmissions of this nature include an output shaft disposed in an extension housing of the transmission which extends through an aperture in the wall of the housing for connection with a drive shaft. Usually, the aperture in the extension housing includes an annular sealing means through which an internally splined end portion of a driveshaft is inserted to engage a corresponding, externally splined end portion of the transmission output shaft. The sealing means in the transmission wall engages the outer surface of the driveshaft end portion to preclude loss of transmission fluid or oil maintained within the housing of such transmission.

However, when it becomes necessary to disconnect the driveshaft from the transmission, for example during servicing thereof, there necessarily is a substantial loss of fluid therefrom in view of the unrestricted annular opening between the transmission output shaft and concentrically disposed sealing means associated therewith.

SUMMARY OF THE INVENTION

Accordingly, a principal object of the present invention is to provide a new closure device or plug for engagement over the end of the output shaft of a transmission after disconnection of a driveshaft therefrom so as to preclude the loss of fluid from the transmission during the time the vehicle driveshaft remains disconnected.

Another object of the present invention is to provide the aforesaid closure plug with sufficient operable versatility so that it may be used with various transmissions having varying output shaft diameters and seal diameters.

In summary, the present invention provides a closure plug for use in precluding the loss of transmission fluid as described hereinabove during servicing of such transmission with the vehicle driveshaft associated therewith being disconnected. The closure plug includes two co-axially aligned tubular portions separated from one another at their adjacent ends by a transversely disposed fluid barrier. The tubular portions have different nominal diameters so as to be operable with transmissions having varying corresponding dimensions wherein the open end of a tubular portion opposite from said fluid barrier may be engaged over the end of a transmission output shaft with the outer surface of the tubular portion engaging the sealing means mounted in the wall of the transmission housing.

The foregoing and other objects, advantages, and characterizing features of the present invention will become clearly apparent from the ensuing detailed description of an illustrative embodiment thereof, taken together with the accompanying drawings wherein like reference characters denote like parts throughout the various views.

DETAILED DESCRIPTION OF A PREFERRED EMBODIMENT

Figure 1:
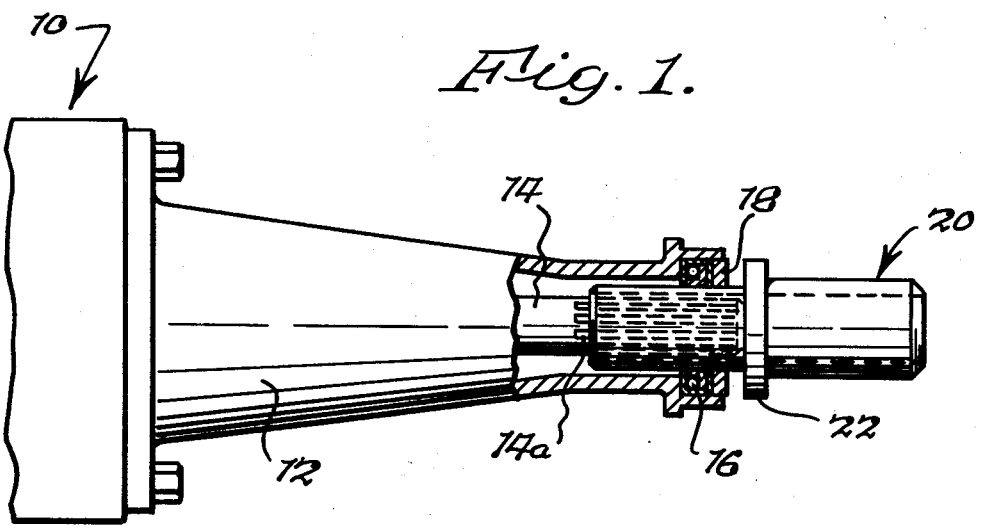
FIG. 1 is a longitudinal view of an extension housing of a vehicular transmission partially in section with portions broken away illustrating the engagement of a tubular portion of the closure plug forming the present invention over the end of the transmission output shaft.

Referring now in detail to the illustrative embodiment depicted in the accompanying drawings, there is shown in FIG. 1 a vehicular drive transmission generally indicated as 10 having an extension housing 12 attached thereto. The transmission includes an output shaft 14 mounted within the extension housing and extending through an aperture in the right hand end wall of housing 12. The driveshaft 14 includes external splines 14a for mating connection with an internally splined end of a vehicular driveshaft, the latter not being shown. The right hand end of the housing extension is formed to include a roller bearing or ball bearing means 16 which functions to mount a connected driveshaft in the housing in a manner minimizing rotational friction. In addition, an annular sealing means 18 is provided within the aperture in the right hand wall of the housing for sealing against the outflow of fluid or oil from the transmission housing interior. Seal 18 is annular in form and functions to seal the gap between the outer surface of a vehicular driveshaft and the periphery of the opening in the extension housing through which the driveshaft is mounted to the end of the transmission output shaft. Necessarily, seal 18 engages the outer surface of the driveshaft in a substantially fluid tight manner while still allowing for rotation of the driveshaft.

As further shown in FIG. 1, the closure plug of the present invention, generally indicated as 20 is shown in an engaged position with respect to the end of the transmission output shaft 14 and seal 18. As shown in detail in FIGS. 2 through 4, the closure plug includes a main body portion 22 and two co-axially aligned tubular portions 24 and 26. Tubular portion 24 is shown to include an outer diameter smaller than the outer diameter of tubular portion 26 for purposes to be described hereinbelow. In addition, the main body portion 22 extends radially outward beyond the outer surfaces of both tubular portions and serves as a fluid barrier between the adjacent ends of portions 24 and 26. The non-adjacent ends of the tubular portions are open and include chamfered leading edges 24a and 26a as shown.

In utilizing the closure plug 20, it is to be understood that when a driveshaft of a vehicle is disconnected from its splined connection with the transmission output shaft 14, an annular opening would exist between the transmission output shaft splines 14a and seal 18. In this condition, a good deal of oil or fluid normally maintained within the transmission housing could flow outwardly and be lost. However, the plug 20 can be inserted over the end of output shaft 14 immediately after disconnection of a driveshaft so as to minimize any loss of fluid and preclude any further potential flow and loss of transmission fluid over the transmission output shaft and through the opening in the right hand end wall of the transmission housing as shown in FIG. 1. The chamfered leading edges on the tubular portions of the plug facilitate sliding engagement thereof through the seal 18. In this manner, seal 18 engages the outer surface of a tubular portion so that fluid is retained in the housing with fluid passing into a tubular portion being retained or choked off by the transversely disposed fluid barrier of the main body portion 22.

Figure 2:
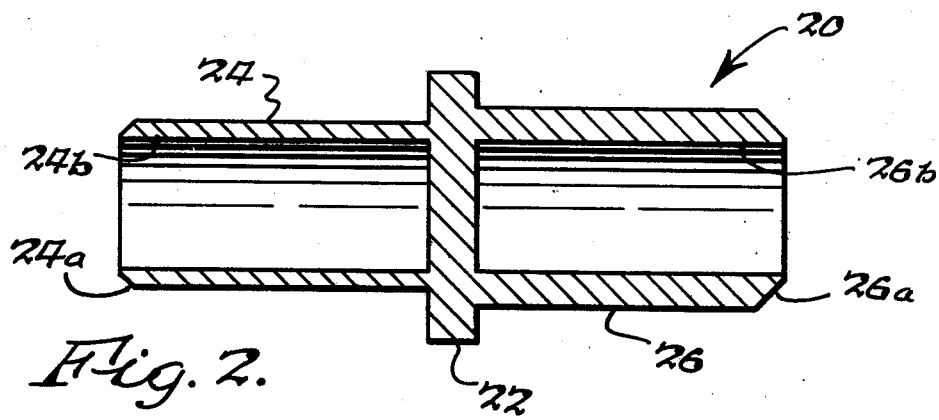
FIG. 2 is a longitudinal view in section of a closure plug forming the present invention having co-axially aligned tubular portions.
Figures 3, 4:
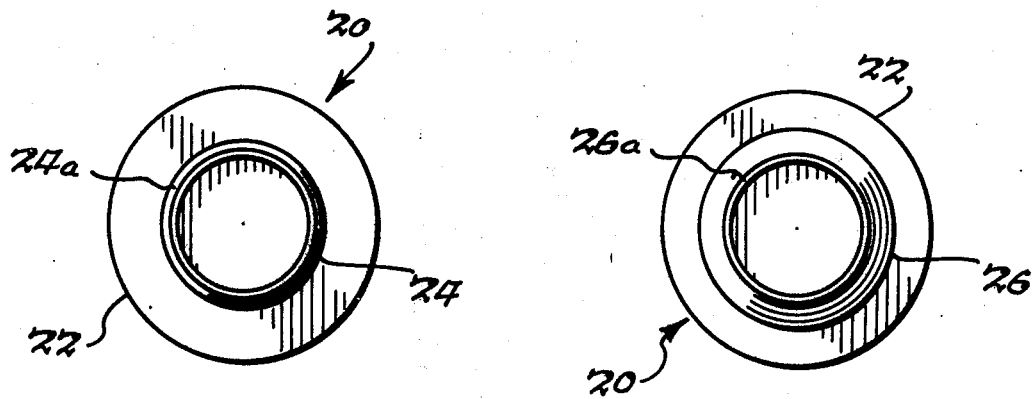
FIG. 3 is a left hand view of FIG. 2.
FIG. 4 is a right hand end view of FIG. 2.

Necessarily, various automobile transmissions are manufactured with output shafts of different diameter sizes and correspondingly different inner diameters on the seals disposed thereabout, such as seal 18. Accordingly, as shown in FIG. 2, the internal diameter of each tubular portion 24 and 26 is shown generally to be about the same so as to be large enough to receive most transmission output shafts. However, the outer surface of tubular portion 26 is of greater diameter than the corresponding dimension of portion 24 so that when seals 18 of relatively larger inner diameters are encountered, portion 26 would be inserted over the end of the transmission output shaft. For smaller seals, tubular portion 24 would be inserted over the transmission output shaft. It is to be understood that the nominal diameters associated with the outer surface of each tubular portion will accommodate most seal inner diameters since the seals necessarily include a certain degree elasticity and for purposes of receiving the closure plug 20 do not have to have a close tolerance fit with respect to the plug. Lastly, it is to be appreciated that the radially outermost portion of the main body 22 facilitates convenient handling, engagement and disengagement of the plug from the transmission.

From the foregoing, it is apparent that the objects of the present invention have been fully accomplished. As a result of this invention, a new tool device for use in servicing automobile transmissions has been provided whereby the loss of transmission fluid or oil can be substantially precluded. Although the closure plug has been shown in FIG. 2 to have two co-axial portions, the plug portions could be formed separately or could be oriented obliquely to one another. In addition, the plug could perhaps include more than two tubular portions all of which could have different outside diameters.

Having thus described and illustrated a preferred embodiment of my invention, it will be understood that such description and illustration is by way of example only and that such modifications and changes as may suggest themselves to those skilled in the art are intended to fall within the scope of the present invention as limited only by the appended claims.

I claim:

1. A drive transmission combination for a vehicle having a drive shaft, said combination comprising: a fluid filled drive transmission housing having an aperture therethrough; a transmission output shaft within said housing and having an end extending through said aperture; means on said output shaft end adapted to drivingly connect said output shaft with said drive shaft when said drive shaft is extended through said aperture; and a readily removable closure device sealing said housing against loss of said fluid throgh said aperture when said drive shaft is removed from said aperture, said closure device comprising: a body shaped so as to be easily held in a user's hand, said body including two tubular portions, each having a predetermined axial length greater than the extension of said drive shaft within said aperture. each of said portions being open at one end and closed at the other end, at least one of said portions having an internal and external diameter whereby the open end thereof is co-axially received between the inner surface of said aperture and the outer surface of said output shaft in a generally concentric manner so as to substantially preclude the potential flow of said fluid over said output shaft and through said aperture.

2. A drive transmission combination as claimed in clam 1 wherein the other of said tubular portions has an external diameter different than the external diameter of said one tubular portion, and said closed ends of said tubular portions are adjacent each other.

3. A drive transmission combination as claimed in claim 2 wherein said tubular portions are co-axially aligned with one another.

4. A drive transmission combination as claimed in claim 3 wherein said closed ends of said tubular portions are formed by a common fluid barrier, said barrier extending radially outwardly beyond the radially outermost surface of said portions.

5. A drive transmission combination as claimed in claims 1, 2, 3, or 4 wherein the open end of said one tubular portion is chamfered so as to facilitate insertion thereof through said aperture, and wherein the open end of said other tubular portion is chamfered.

6. A drive transmission combination as claimed in claim 1 and further comprising.

* * * * *